United States Patent
Fleming et al.

(10) Patent No.: US 9,852,002 B2
(45) Date of Patent: Dec. 26, 2017

(54) SYSTEMS, METHODS, AND APPARATUSES FOR RESOURCE MONITORING

(71) Applicant: Intel Corporation, Santa Clara, CA (US)

(72) Inventors: Matthew Fleming, Brighouse (GB); Edwin Verplanke, Chandler, AZ (US); Andrew Herdrich, Hillsboro, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 14/671,515

(22) Filed: Mar. 27, 2015

(65) Prior Publication Data

US 2016/0283246 A1    Sep. 29, 2016

(51) Int. Cl.
    *G06F 9/455*     (2006.01)
    *G06F 9/46*      (2006.01)
(52) U.S. Cl.
    CPC ............ *G06F 9/46* (2013.01); *G06F 9/45558* (2013.01); *G06F 2009/4557* (2013.01); *G06F 2009/45591* (2013.01)

(58) Field of Classification Search
    CPC ................................................... G06F 9/3836
    See application file for complete search history.

(56) References Cited

U.S. PATENT DOCUMENTS

| | | | | |
|---|---|---|---|---|
| 8,392,657 | B2* | 3/2013 | Zhao | G06F 12/0864 711/121 |
| 2003/0105796 | A1* | 6/2003 | Sandri | G06F 9/5011 718/104 |
| 2005/0166206 | A1* | 7/2005 | Parson | G06F 9/526 718/104 |
| 2007/0005887 | A1* | 1/2007 | Larson | G06F 9/468 711/118 |

* cited by examiner

*Primary Examiner* — Meng An
*Assistant Examiner* — Jorge A Chu Joy-Davila
(74) *Attorney, Agent, or Firm* — Nicholson De Vos Webster & Elliott LLP

(57) ABSTRACT

Systems, methods, and apparatuses for resource monitoring identification reuse are described. In an embodiment, a system comprising a hardware processor core to execute instructions storage for a resource monitoring identification (RMID) recycling instructions to be executed by a hardware processor core, a logical processor to execute on the hardware processor core, the logical processor including associated storage for a RMID and state, are described.

17 Claims, 16 Drawing Sheets

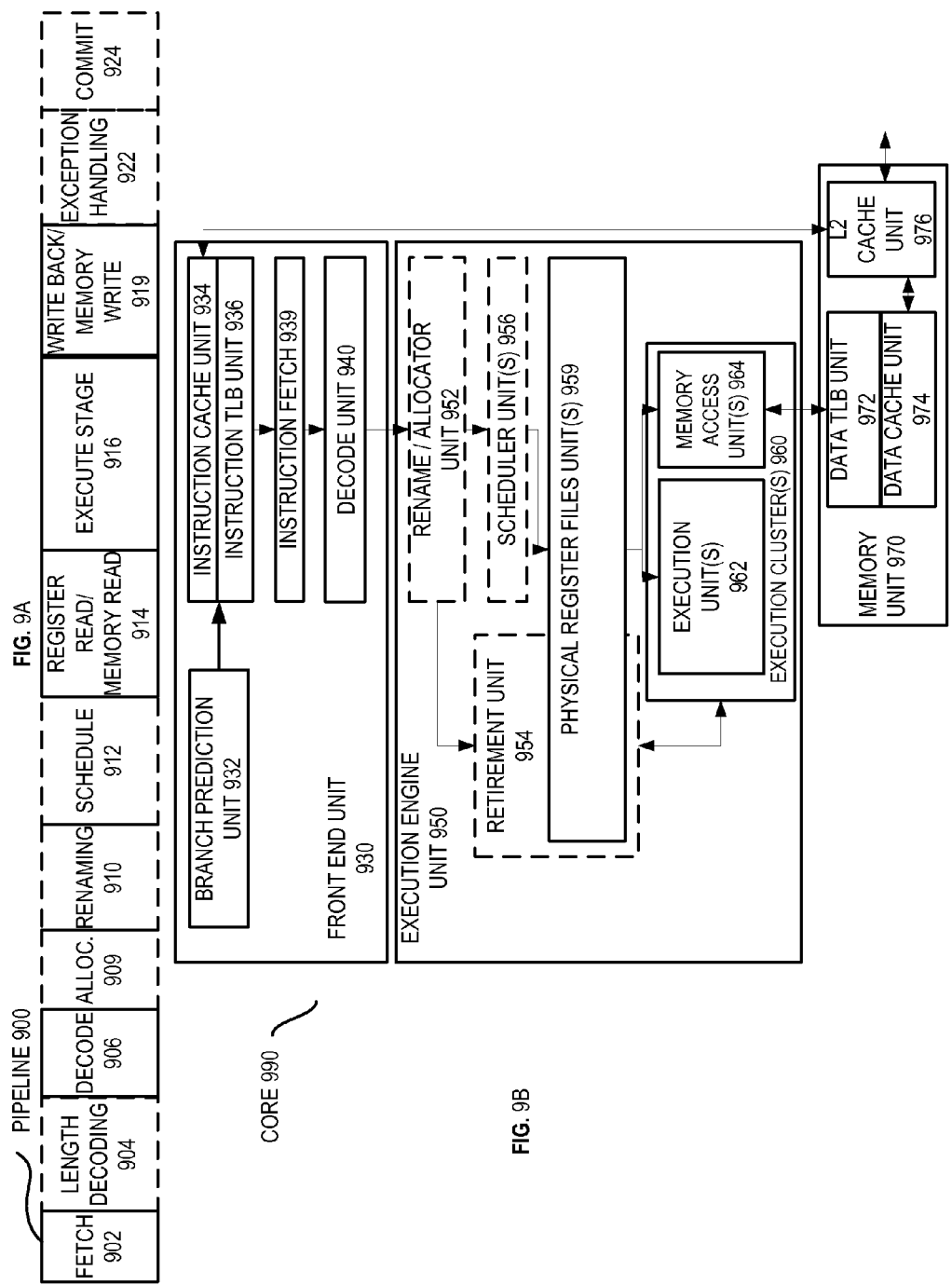

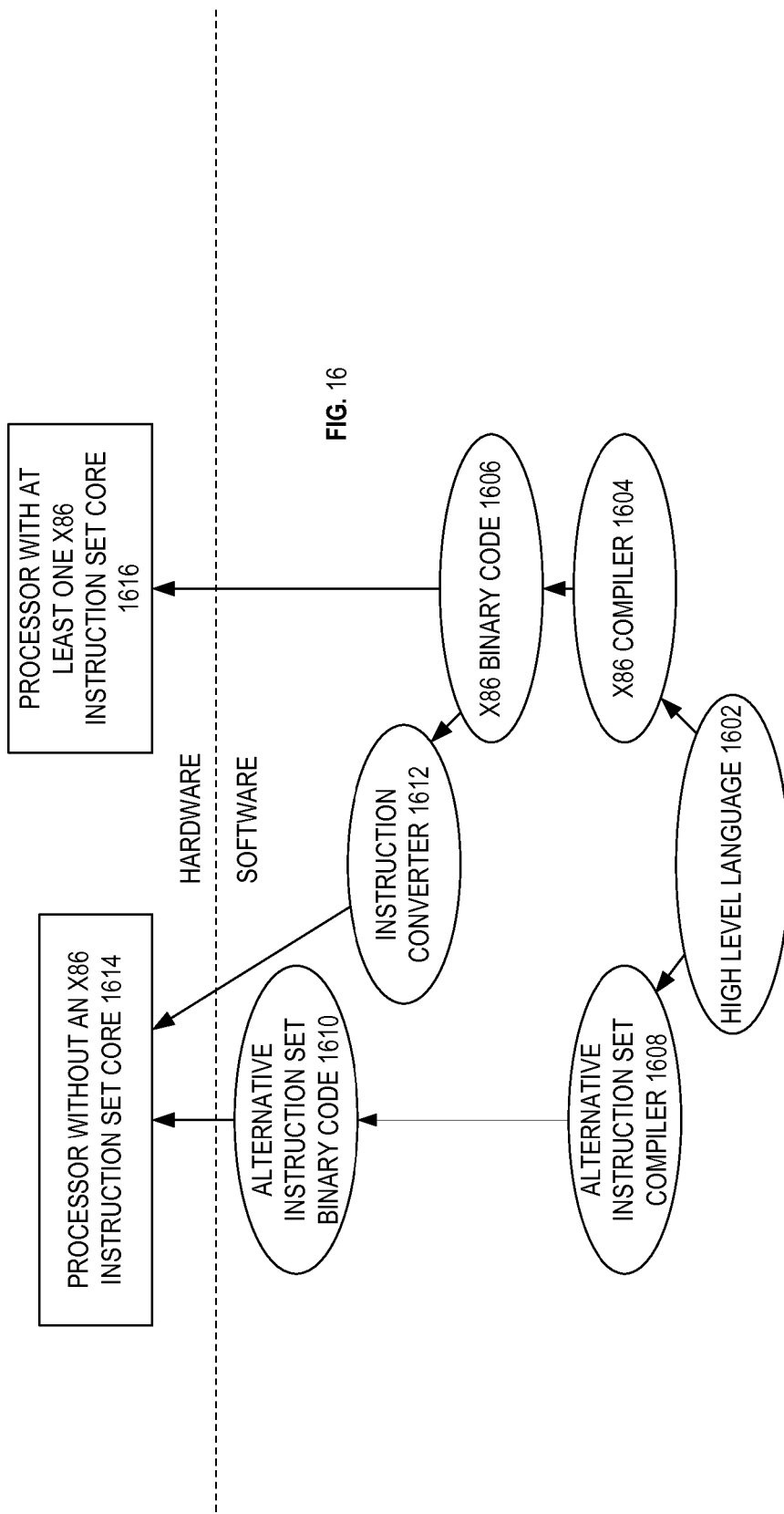

SYSTEMS, METHODS, AND APPARATUSES FOR RESOURCE MONITORING

FIELD

The various embodiments described herein relate to resource monitoring in a computer processor or platform.

BACKGROUND

Thread contention for shared platform resources such as cache space and memory bandwidth is an increasingly common problem in datacenter and communications scenarios. For example, in a datacenter heavy consolidation may lead to situations where applications are running from tens to hundreds of users on the same platform without any visibility into what is co-running. As such, a given user's application may slow down significantly due to contention for shared cache, memory, and/or input/output (I/O) resources. For example, an application virtual machine (VM) has no way to tell what else is running on the platform, has no control over platform resources, and has no guarantee that the application VM will receive a fair share of platform resources such as cache space and memory bandwidth. Other VMs may thrash available cache, consume excessive memory bandwidth, etc. and the application VM would be slowed significantly without any control or fairness mechanisms.

BRIEF DESCRIPTION OF THE DRAWINGS

The present invention is illustrated by way of example and not limitation in the figures of the accompanying drawings, in which like references indicate similar elements, and in which:

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIG. 16 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
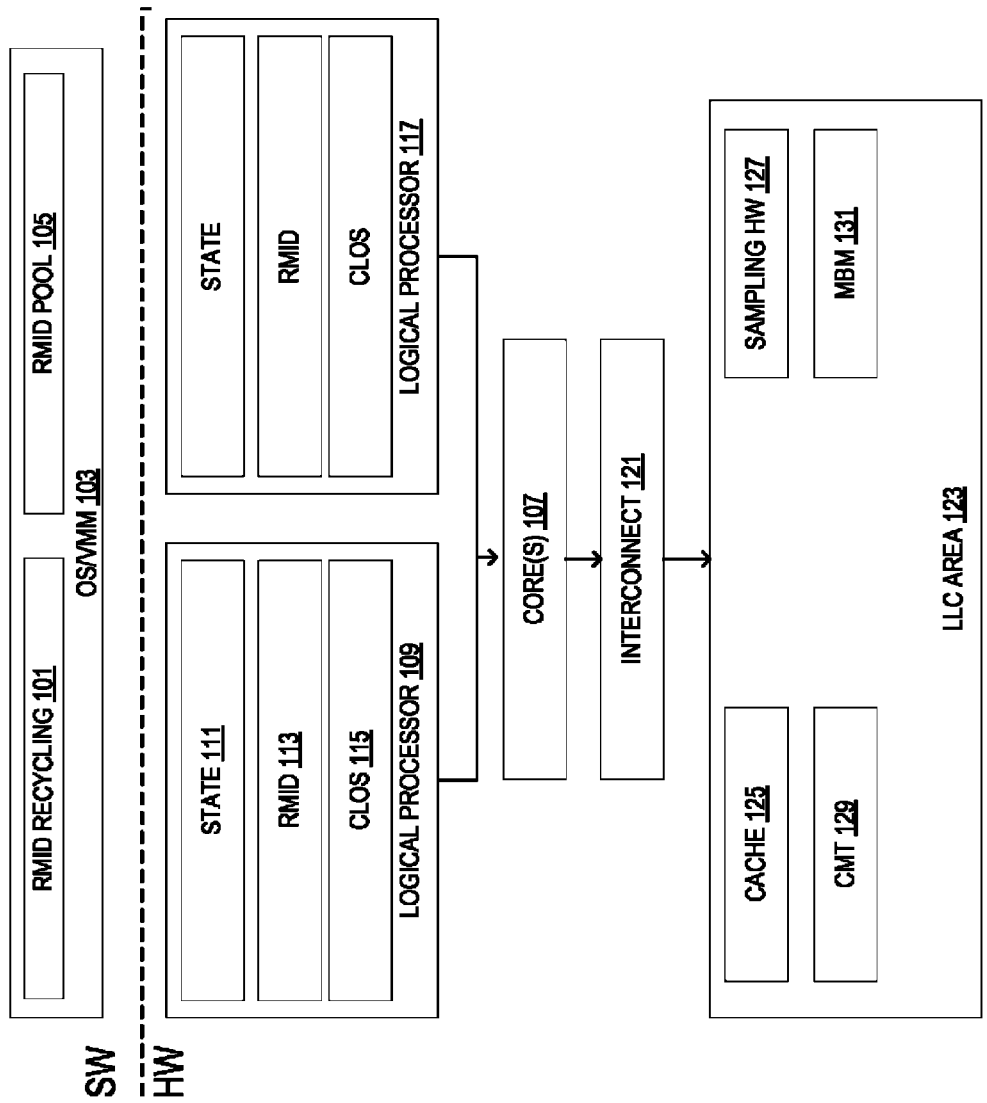
FIG. 1 illustrates an embodiment of a system to reuse resources.

FIG. 1 illustrates an embodiment of a system to reuse resources. In this illustration, there are several components including both software (an operating system (OS) or a virtual machine monitor (VMM) also called a hypervisor) stored in memory (such as random access memory RAM or static memory such as a disk) and hardware components.

In an embodiment, a mechanism for an OS or hypervisor to indicate a software-defined identification (ID) for one or more software threads (applications, virtual machines, etc.) scheduled to run on a logical processor is called a Resource Monitoring ID (RMID). Each logical processor (thread) in the system can be assigned an RMID independently, or multiple logical processors can be assigned to the same RMID value (e.g., to track an application with multiple threads). For each logical processor, only one RMID value is active at a time. In some embodiments, the number of RMIDs per processor is given by information stored in the processor itself.

There are a finite number of RMIDs available on a platform (typically tens to hundreds), while a system may run thousands of threads or applications of interest, meaning that a scheme to efficiently recycle RMIDs in real-time would be beneficial.

It is possible to run up against this hardware limitation very quickly in real world scenarios, for example when monitoring more software threads than there exist RMIDs. Detailed below are embodiments of systems, apparatuses, and methods for monitoring available resources including software and hardware schemes that reuse or recycle RMIDs. Below are several embodiments to overcome the limited RMID resource by reusing or recycling RMIDs both using software algorithms and mechanisms implemented at the hardware level. The principle behind the algorithms and mechanisms is that of choosing a hardware RMID whose associated cache occupancy value will have a minimal impact on the cumulative occupancy when re used for another software thread. This translates to always trying to find an RMID with an associated occupancy value that is as close to zero as possible and/or an RMID which has converged or is converging to zero quickly for reuse. The recycling mechanisms are based on the principle of providing more virtual RMIDs than the hardware actually provides. From a software standpoint, a scheme to make all unused RMIDs appear to have a zero occupancy when read from software without performing any untagging of the cache data is provided, while RMIDs that are in use will have (usually) nonzero occupancy corresponding to the actual cache use of the applications.

Figure 3:
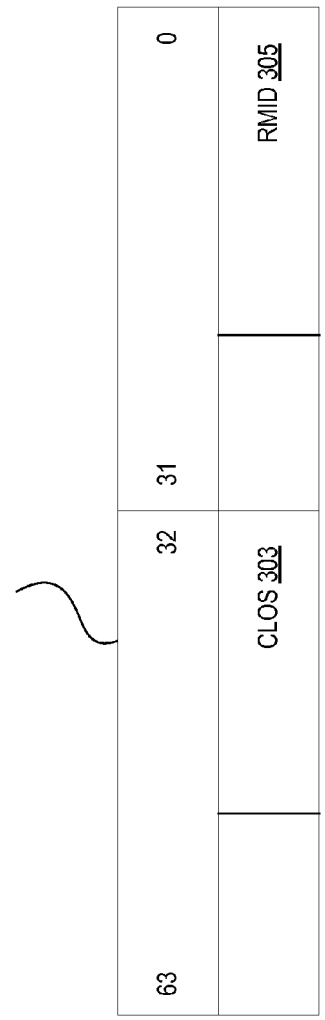
FIG. 3 illustrates an embodiment of a MSR.

In some embodiments, this is enforced through one or more machine state registers (MSRs) that specifies the active RMID of a logical processor. FIG. 3 illustrates an embodiment of these registers. In this example, a per logical processor (e.g., thread) MSR 301 includes fields for class of service (CLOS) 303 and RMID 305.

These MSRs are hardware components of a processor that are accessible to a logical processor such as a thread, as illustrated by logical processor 109. Writing to this MSR changes the active RMID of the logical processor from an old value to a new value and the same with CLOS. In this example, RMID 113 and CLOS 115 are shown as separate entities in the logical processor, but as noted above in FIG. 3, they may be fields in a single register. The logical processor 109 also includes a mechanism (such as one or more registers or cache memory) to store a state of the logical processor 109. Typically, there are more than one logical processors 109, 117 that are executed on one or more hardware cores such as core 119. Not shown is a credit accounting mechanism of the core which, in some embodiments, is per logical processor (RMID).

Figure 2:
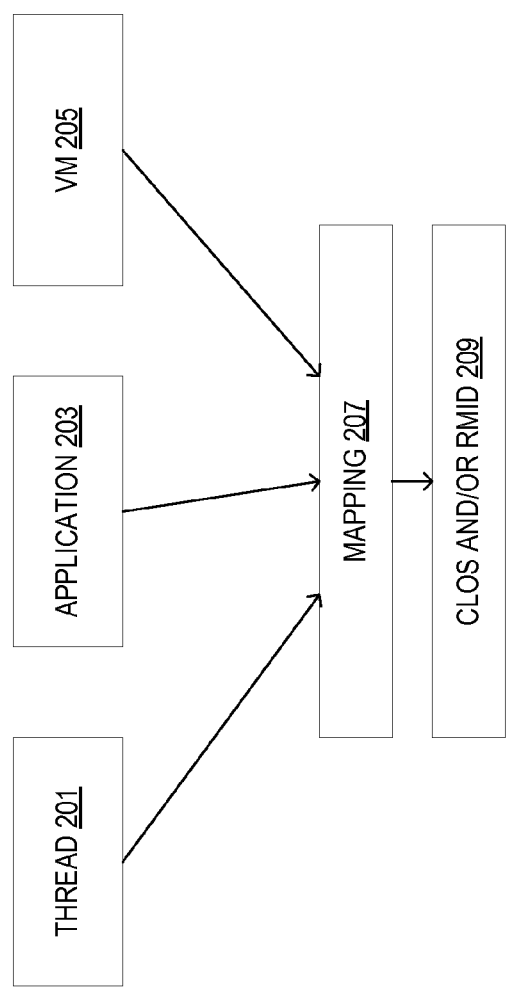
FIG. 2 illustrates an embodiment of a flexible mapping scheme to assign RMIDs or CLOS.

Threads may be monitored individually or in groups, and multiple threads may be given the same RMID or CLOS. FIG. 2 illustrates an embodiment of a flexible mapping scheme to assign RMIDs or CLOS. One or more threads 201, applications 203, and/or VMs 205 are subjected to a mapping 207 algorithm to select one or more RMIDs or CLOS.

As each application 203 or VM 205 consists of one or more threads, each application or VM is capable of being monitored. For example, all threads in a given VM could be assigned the same RMID or CLOS, as could all threads in an application. When a thread is swapped onto a core, the architectural register state of the logical processor is swapped into the hardware thread on the physical core.

Coupled to the core(s) is an interconnect 121. In some embodiments, this interconnect is a point-to-point link between cores and at least a last level cache (LLC) area 123. This area 123 includes cache memory 125 and in some embodiments includes sampling hardware 127, cache monitoring technology (CMT) hardware 129, and memory bandwidth monitoring hardware 131. These shared resource monitoring hardware track cache metrics such as cache utilization and misses as a result of memory accesses according to the RMIDs and typically report monitored data via one or more counter registers.

In some embodiments, software 103 includes instructions for RMID recycling 101 and a pool for RMIDs 105 for the processor (available or not). Software executing on each core is subject to the limit for memory bandwidth that the OS or VMM has programmed for it, allowing the OS/VMM to prioritize apps and to limit "noisy neighbor" applications which may be over-utilizing memory bandwidth. This has applicability across the datacenter, communications, NFV/SDN, etc.

Figure 4:
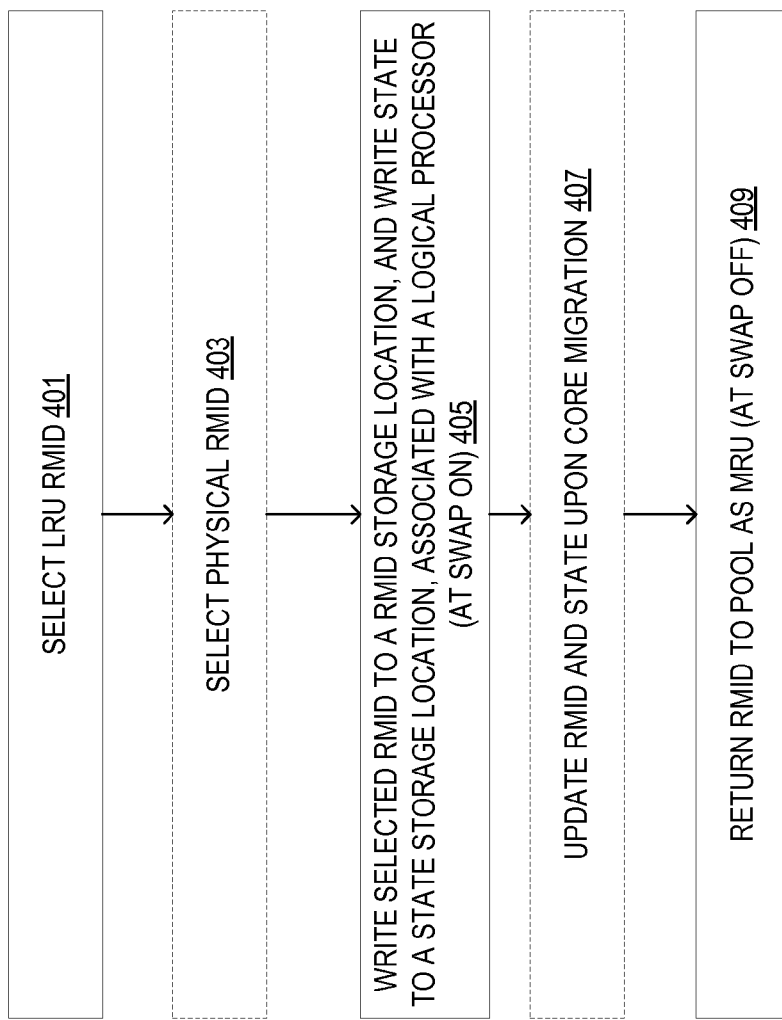
FIG. 4 illustrates an embodiment of a method for tracking more threads, applications, or VMs than the number available on the platform.

FIG. 4 illustrates an embodiment of a method for tracking more threads, applications, or VMs than the number available on the platform. In this embodiment, least recently used (LRU) RMIDs are recycled. Typically, this recycling method is code run in an OS or VMM such as RMID recycling 101. In this embodiment, a least-recently used (LRU) list of RMIDs is maintained. This may be an extension of RMID pool 105 (wherein the pool identifies when RMIDs are used) or as a separate data structure (such as a queue of RMIDs). Typically, this list is maintained by software. The LRU list mimics the behavior of the cache in that RMIDs that have been used to monitor a software thread most recently are the most likely to have a high data occupancy value. RMIDs that were used farther in the past are more likely to have had any data naturally evicted from the cache and consequently should have small data occupancy values.

At 401, a LRU RMID is selected at 401. For example, a LRU RMID from RMID pool 105 is selected by an OS or VMM. In a queue scenario, the end of the queue is selected.

In some embodiments, the LRU RMID that is selected is a virtual RMID that is always allocated. Accordingly, a corresponding physical RMID will need to be selected at 403.

At 405, at swapping on to the core, the selected RMID is written to a RMID storage location associated with the logical processor of the application, VM, thread, etc. For example, a RMID value is written to the MSR for the logical processor as shown in as RMID storage 113. Additionally, the thread state is written to a storage location such as 111. Typically, one or both of these writings are done when the thread is swapped onto the core such that is to be executed by the core.

The writing of the RMID value and state are updated upon core migrations at 407 in some embodiments. For example, as the thread is swapped between cores (from a first core to second core), the RMID value and state follow the thread.

At 409, the RMID associated with the thread is returned to the RMID pool when the thread is swapped off core. For example, the RMID is put back into RMID pool 105. In some embodiments with a RMID queue, the RMID goes to the most recently used (MRU) end of the queue.

Figure 5:
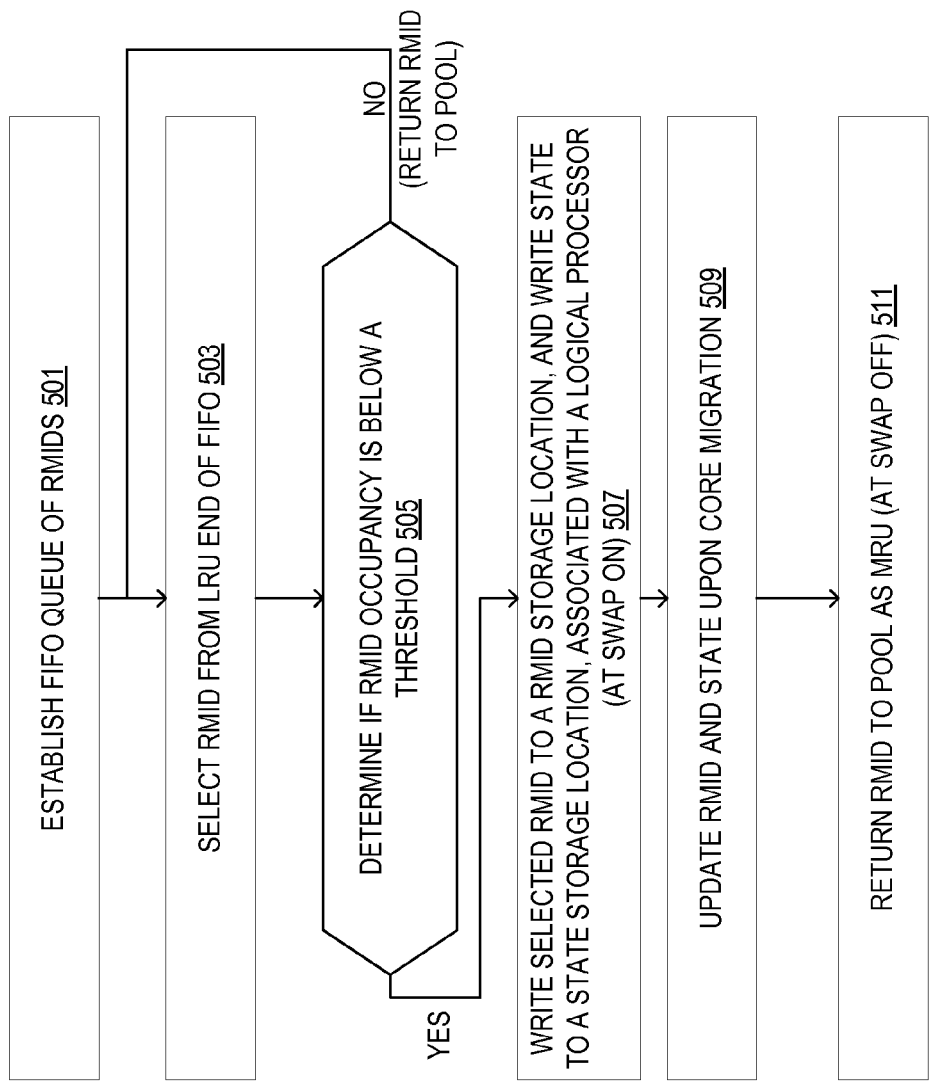
FIG. 5 illustrates an embodiment of a method for reusing RMIDs for a thread.

FIG. 5 illustrates an embodiment of a method for reusing RMIDs for a thread. In this embodiment, least recently used (LRU) RMIDs are recycled, but with an additional check. Typically, this recycling method is code run in an OS or VMM such as RMID recycling 101. In this embodiment, a least-recently used (LRU) list of RMIDs is maintained. This may be an extension of RMID pool 105 (wherein the pool identifies when RMIDs are used) or as a separate data structure (such as a queue of RMIDs). Typically, this list is maintained by software. The LRU list mimics the behavior of the cache in that RMIDs that have been used to monitor a software thread most recently are the most likely to have a high data occupancy value. RMIDs that were used farther in the past are more likely to have had any data naturally evicted from the cache and consequently should have small data occupancy values.

At 501, a first-in, first-out (FIFO) queue of RMIDs by order of use is established.

At 503, a LRU RMID from the end of the queue is selected.

Figure 6:
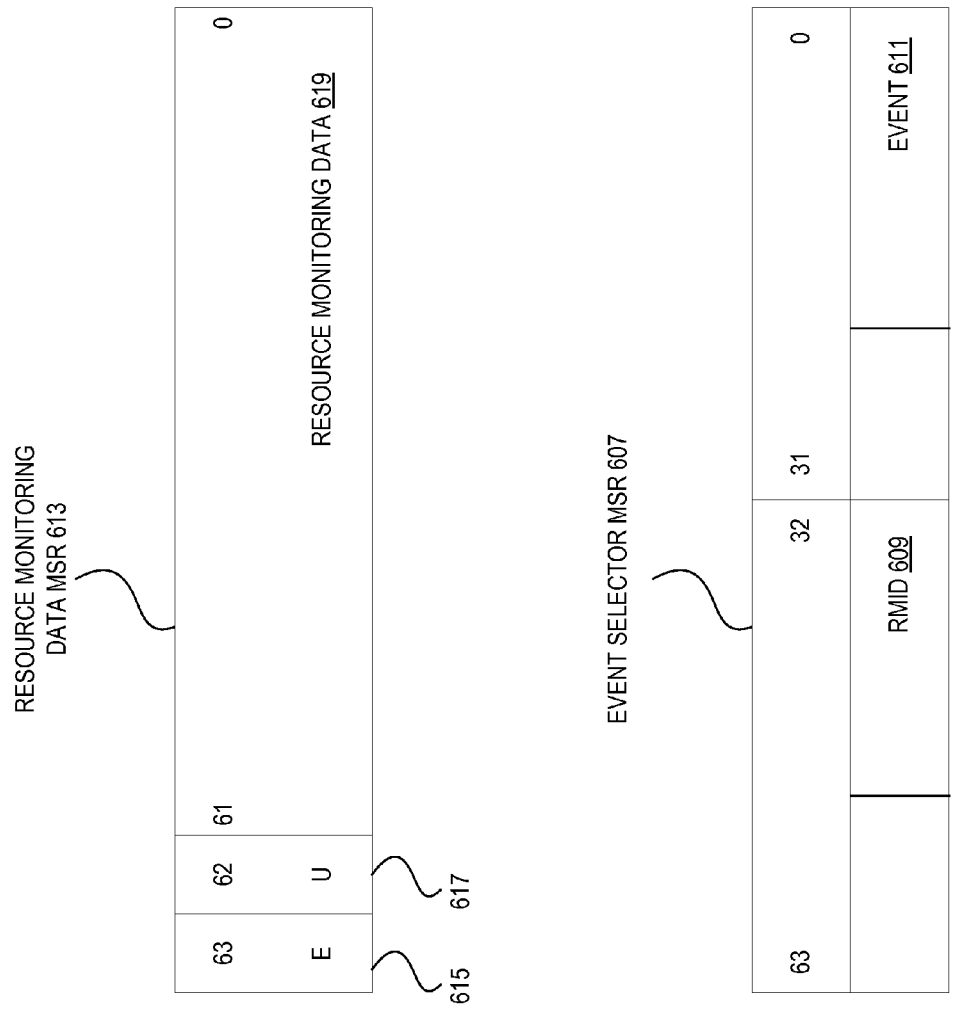
FIG. 6 illustrates an embodiment of per thread MSRs that are used to report RMID occupancy.

At 505, a determination of if the selected RMID's occupancy (its associated L3 cache occupancy) is below a threshold is made. In some embodiments, the RMID occupancy is reported by a combination of two MSRs. FIG. 6 illustrates an embodiment of per thread MSRs that are used to report RMID occupancy. A first MSR 613 is used to store resource monitoring data. This MSR reports monitored data when available and contains three bit fields. An event field 615, unavailable field 617, and resource monitoring data 619. If software configures an unsupported RMID or event type in then 615 is set, indicating there is no valid data to report. If the unavailable field 617 is set, it indicates monitored data for the RMID is not available, and field 619 should be ignored. The occupancy data is in field 619 for the determination of 505.

A second MSR is a per thread event selector MSR 607. This MSR 607 includes a field for a RMID 609 and an event ID 611. Exemplary event IDs include L3 cache occupancy, L3 cache total external bandwidth, and L3 cache local external bandwidth. In the above determination, the event ID has been set to track occupancy.

When the RMID occupancy is not below the threshold, another RMID from the LRU end of the FIFO is selected at 503 and the selected RMID is returned to the pool as MRU. When the RMID occupancy is below the threshold, then, at 507, at swapping on to the core, the selected RMID is written to a RMID storage location associated with the logical processor of the application, VM, thread, etc. For example, a RMID value is written to the MSR for the logical processor as shown in as RMID storage 113. Additionally, the thread state is written to a storage location such as 111. Typically, one or both of these writings are done when the thread is swapped onto the core such that is to be executed by the core.

The writing of the RMID value and state are updated upon core migrations at 509 in some embodiments. For example, as the thread is swapped between cores (from a first core to second core), the RMID value and state follow the thread.

At 511, the RMID associated with the thread is returned to the RMID pool when the thread is swapped off core. For example, the RMID is put back into RMID pool 105. In some embodiments with a RMID queue, the RMID goes to the most recently used (MRU) end of the queue.

Figure 7:
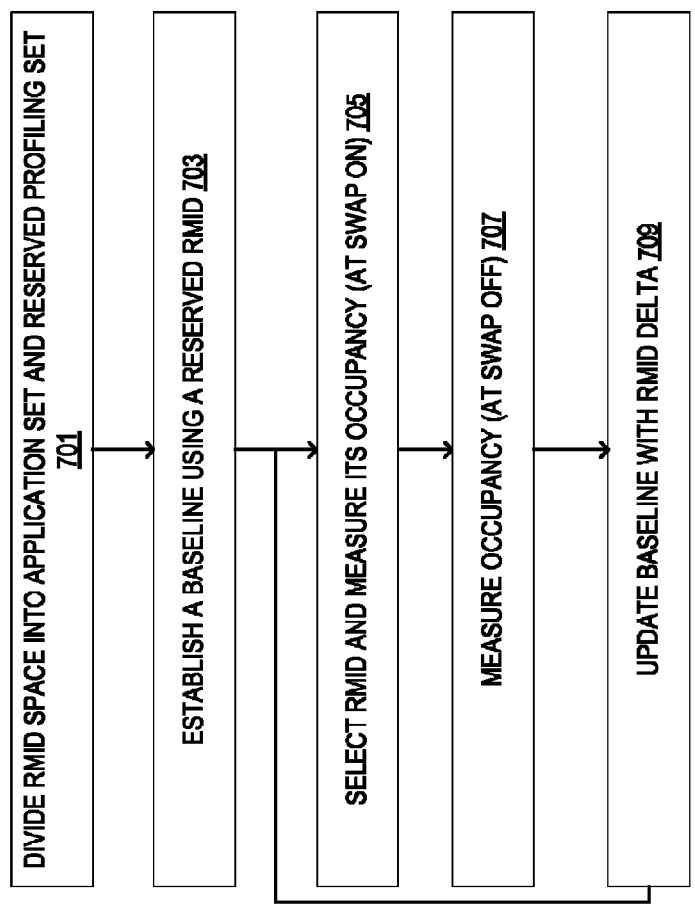
FIG. 7 illustrates an embodiment of a method for reusing RMIDs for a thread.

FIG. 7 illustrates an embodiment of a method for reusing RMIDs for a thread. In this embodiment, there is no searching for an RMID with an occupancy value below some threshold because only a delta measurement is required from previous occupancy values. With this delta measurement, a statistically accurate representation of the cache usage of a software thread can then be constructed. Typically, this recycling method is code run by an OS or VMM such as RMID recycling 101.

In some embodiments, a least-recently used (LRU) list of RMIDs is maintained. This may be an extension of RMID pool 105 (wherein the pool identifies when RMIDs are used) or as a separate data structure (such as a queue of RMIDs). Typically, this list is maintained by software. The LRU list mimics the behavior of the cache in that RMIDs that have been used to monitor a software thread most recently are the most likely to have a high data occupancy value. RMIDs that were used farther in the past are more likely to have had any data naturally evicted from the cache and consequently should have small data occupancy values.

At 701, the RMID space is divided into an application set and a reserved profiling set of RMIDs. For example, RMID [N−m:0] are available for use by applications and RMID [N:(N−m+1)] are available for profiling. Typically, the reserved profiling set is a smaller set of physical RMIDs.

At 703, a baseline of cache occupancy is established using an RMID from the reserved profiling set. Typically, this baseline is stored in a memory location associated with the OS, VMM, application, thread, etc. In some embodiments, a register is dedicated for this purpose.

At 705, at swapping on to the core, a random RMID is written to a RMID storage location associated with the logical processor of the application, VM, thread, etc. and its associated cache occupancy is measured. For example, a RMID value is written to the MSR for the logical processor as shown in as RMID storage 113. Additionally, the thread state is written to a storage location such as 111. Typically, one or both of these writings are done when the thread is swapped onto the core such that is to be executed by the core. As detailed above, in some embodiments, the RMID cache occupancy is reported by a combination of two MSRs. In some embodiments, a LRU RMID is selected at 705.

When the thread is swapped off core, the RMID's cache occupancy is measured. Again, this is typically reported out by at least one MSR.

The previous baseline for cache occupancy is updated with an RMID delta (increase or decrease) at 705. The updating, selecting, and measurement are repeated for the thread's lifetime.

Figure 8:
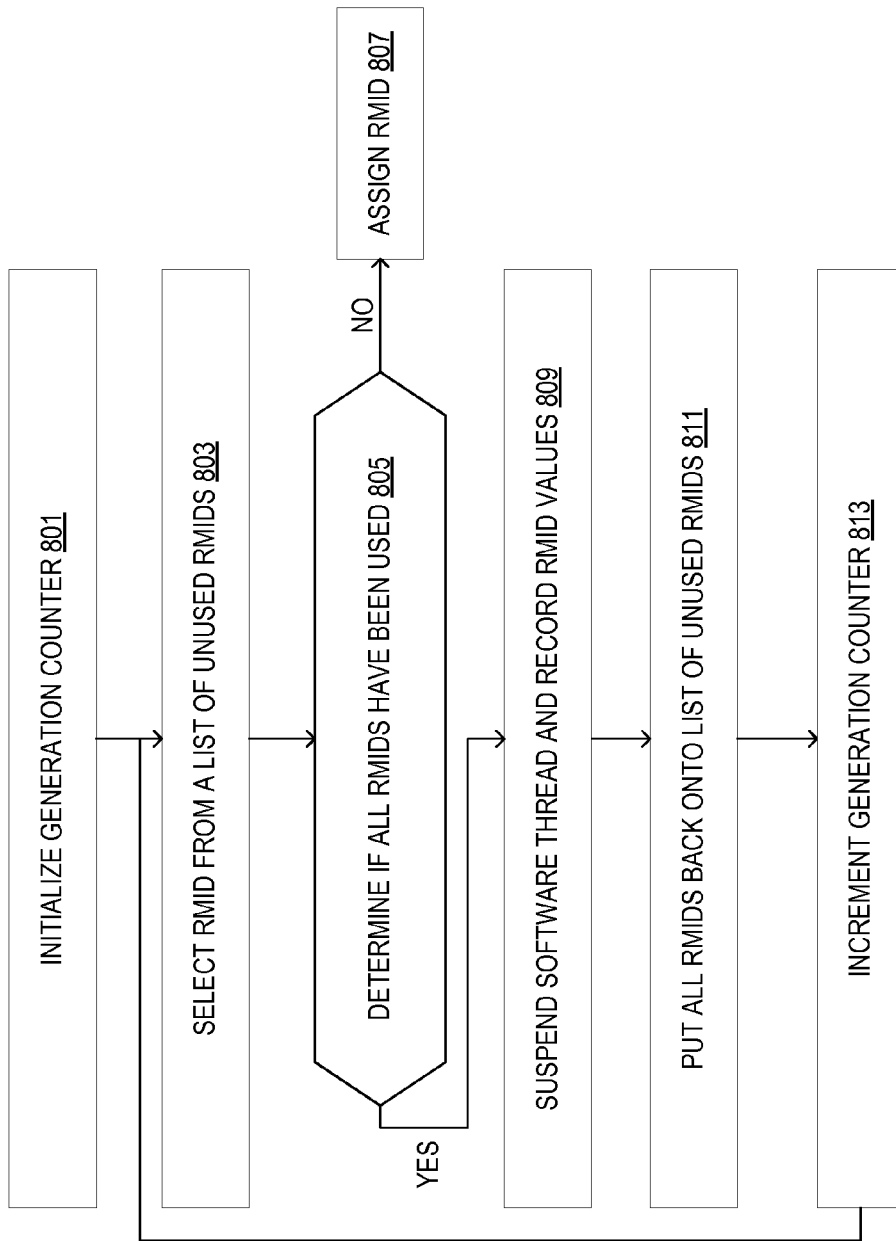
FIG. 8 illustrates an embodiment of a method using hardware to mitigate the accumulation effect of previous cache occupancy data when an RMID is reused.

FIG. 8 illustrates an embodiment of a method using hardware to mitigate the accumulation effect of previous cache occupancy data when an RMID is reused. For this method, the RMID namespace is extended to add a "tag," or "generation" register that is combined with the existing RMIDs to produce a larger RMID number. All RMIDs are transitioned to the new generation by incrementing the value in a generation counter. The transition is performed by software once it has recorded all existing RMID occupancy values, since once the transition occurs all RMIDs will have a zero occupancy value. This is less costly in terms of complexity and size to add a register out-of-band of the existing RMID technology.

At 801, a generation counter is initialized. This counter may be a part of a physical core or a software counter.

A RMID is selected from a list of unused RMIDs at 803. Typically, this list comes from the RMID pool 105. This selection may be done by a RMID algorithm or by hardware.

A determination of if all RMIDs have been used is made at 805. For example, is the list of available RMIDs null? If no, then the selected RMID is assigned to a software thread at 807 and used in its normal tracking functions.

If yes, then all software threads are suspended and all RMID values are recorded at 809. Essentially, all RMIDs are recycled at 809 when they run out.

All RMIDs are put back into the free list of the RMID pool 105 at 811 and the RMID namespace is extended by the tag or incrementing the generation counter at 813. A RMID is then selected at 803 for use by the thread.

Note that while embodiments of the methods above are primarily software methods, they may also be performed solely in hardware.

Detailed below are exemplary core architectures, processors, and architectures that may utilize the above described embodiments.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, microcode entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
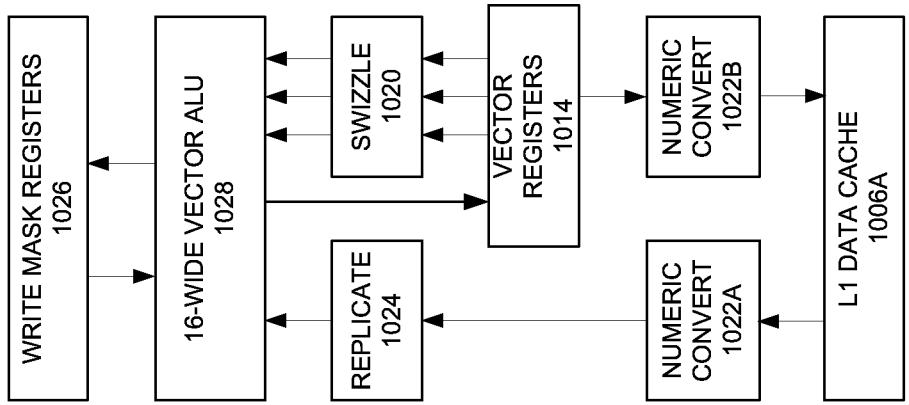
FIGS. 10A-B illustrate a block diagram of a more specific exemplary in-order core architecture, which core would be one of several logic blocks (including other cores of the same type and/or different types) in a chip.
Figure 10A:
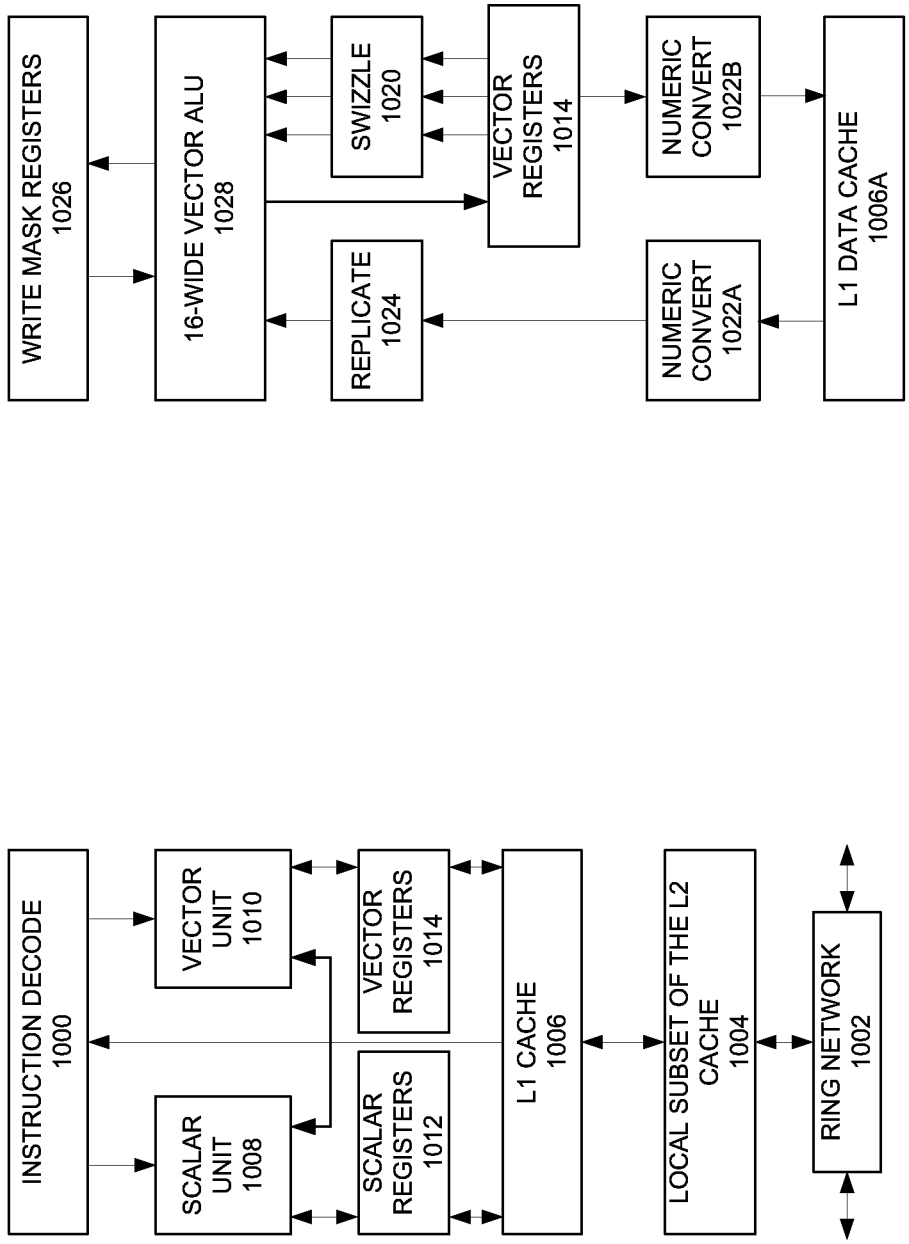

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
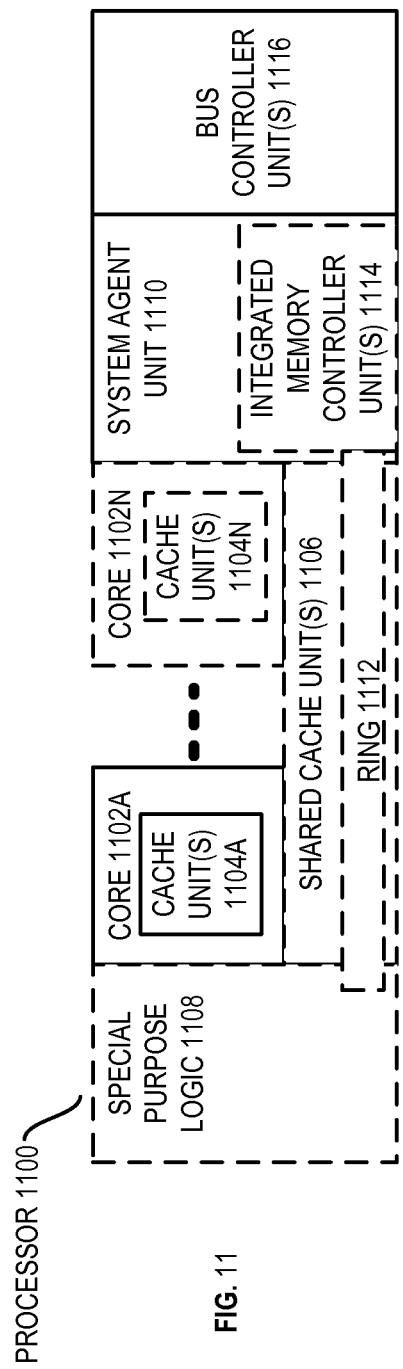
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
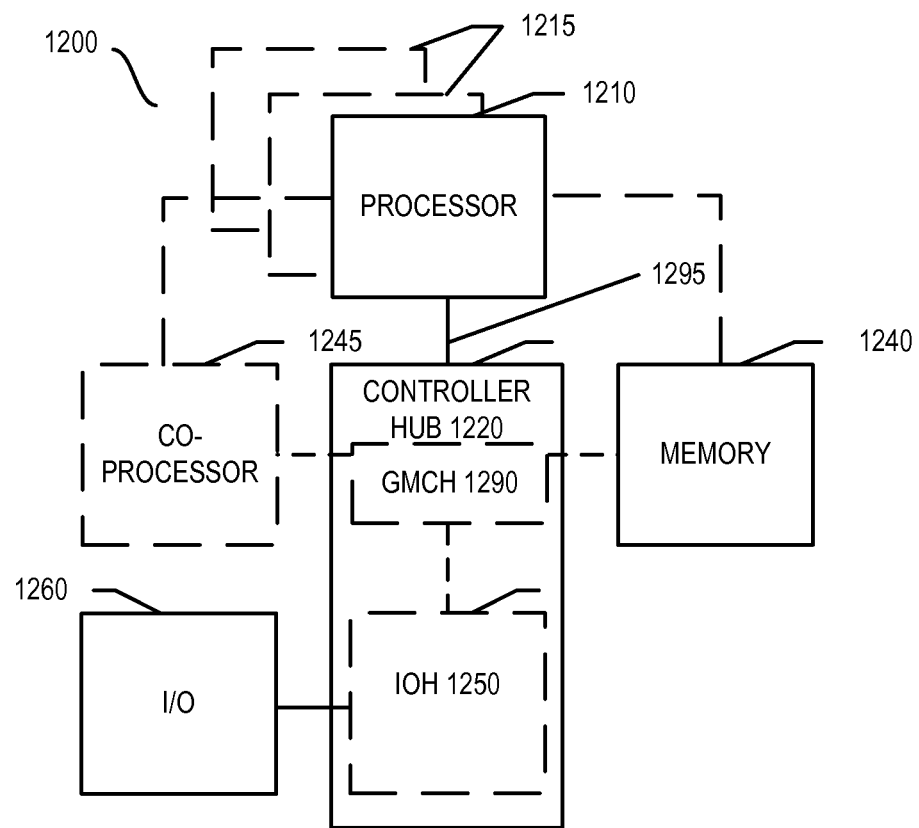
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
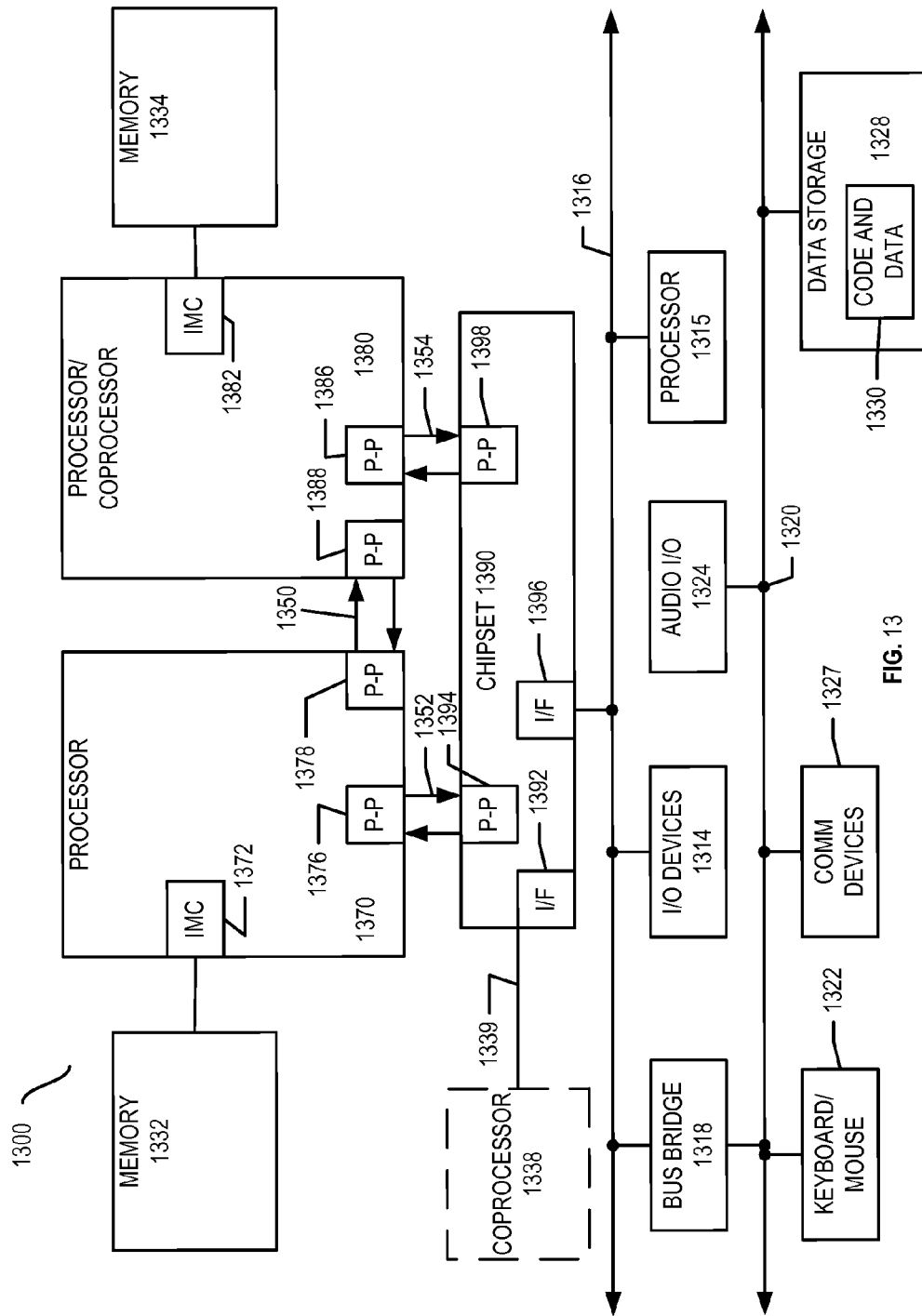

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
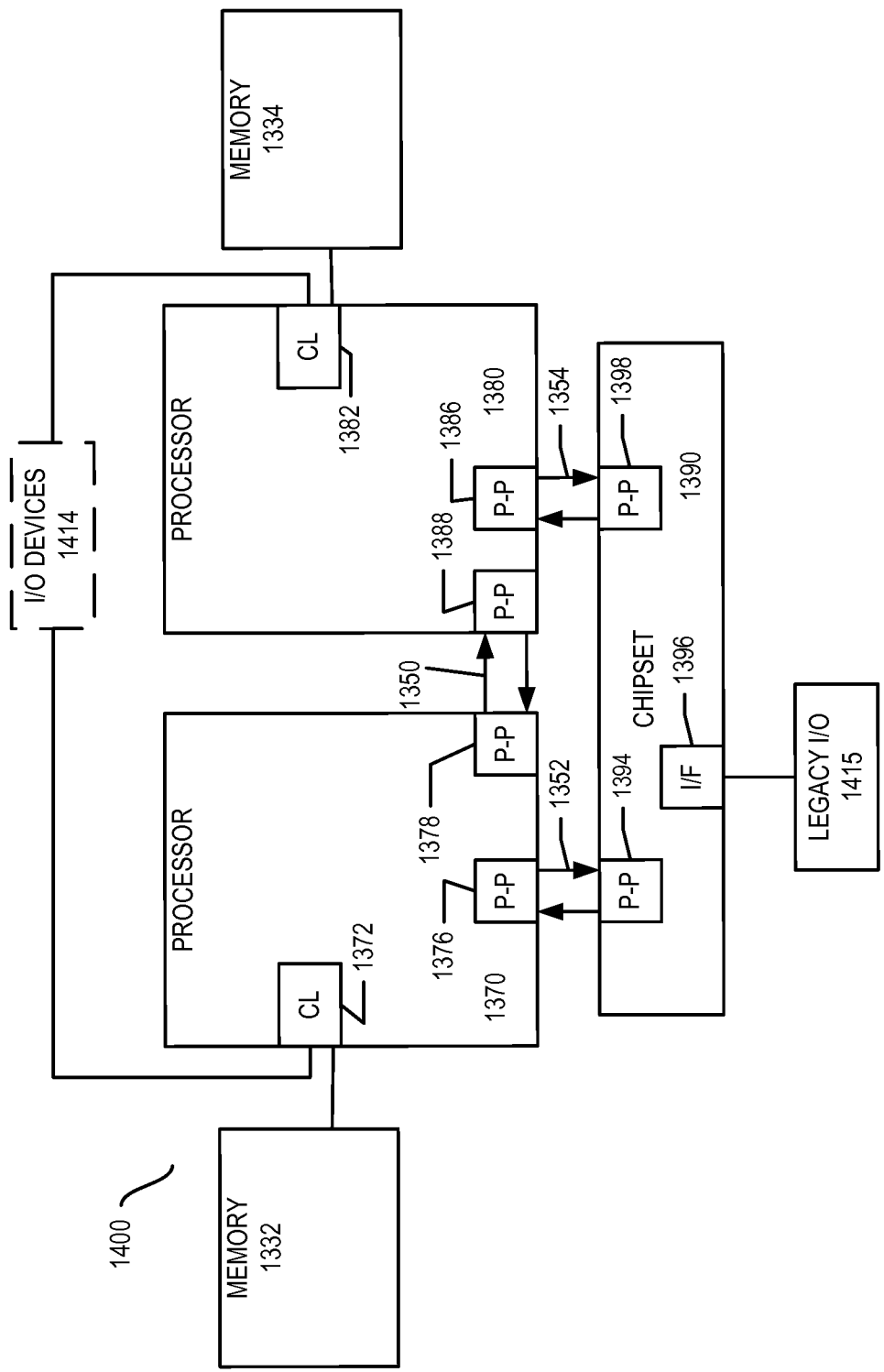

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
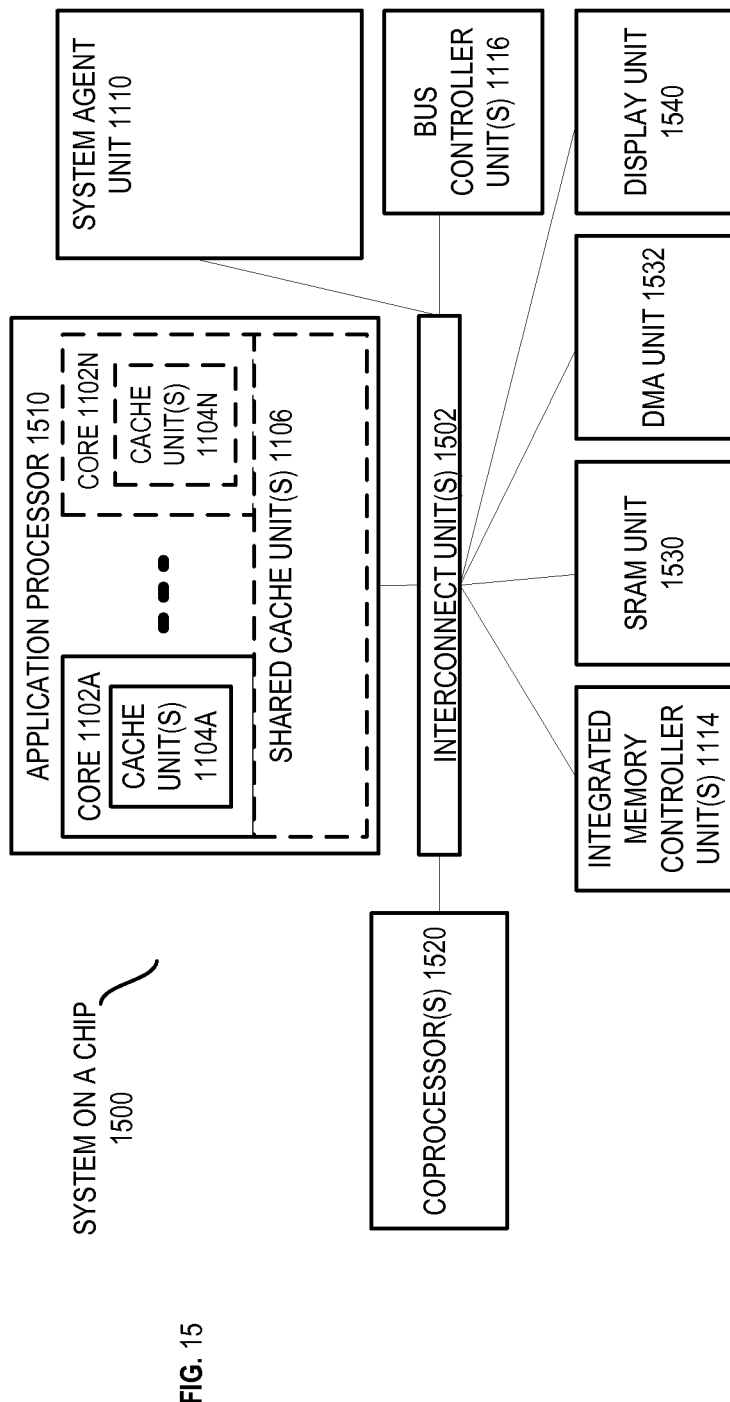

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

We claim:

1. A system comprising:
  a hardware processor core to execute a RMID recycling instruction;
  memory for storing the RMID recycling instruction when executed by the hardware processor core for recycling resource monitoring identification (RMID);
  a plurality of logical processors, each logical processor including associated storage for storing a selected least recently used RMID and for storing state for the associated logical processor at the hardware processor core swap on.

2. The system of claim 1, wherein the each logical processor is a thread.

3. The system of claim 1, wherein the storage for the RMID is a machine state register for the each logical processor in the hardware processor core.

4. The system of claim 1, wherein the hardware processor core further comprises:
  a plurality of machine state registers to store resource monitoring data; and
  a plurality of machine state registers to store an event to be associated with an RMID.

5. The system of claim 4, wherein the event is memory bandwidth.

6. The system of claim 4, wherein the event is cache occupancy.

7. The system of claim 1, wherein the RMID recycling instruction, when executed by the hardware processor core to cause:
  a selection of the least recently used RMID;
  at hardware processor core swap on, a write of the selected RMID to the associated storage for the RMID and a write of a logical processor state to the associated storage for the state; and
  at hardware processor core swap off, a return of the selected RMID to a pool.

8. The system of claim 7, wherein the RMID recycling instruction, when executed by the hardware processor core to further cause a selection of a physical RMID.

9. The system of claim 7, wherein the RMID is to be returned to the pool as a most recently used RMID.

10. The system of claim 1, wherein the RMID recycling instruction, when executed by the hardware processor core to cause:
  a selection of an RMID from a least recently used end of a first in, first out queue of RMIDs;
  a determination that the selected RMID's occupancy is below a threshold;
  at hardware processor core swap on, a write of the selected RMID to the associated storage for the logical processor and a write of the logical processor state to the associated storage for the state; and
  at hardware processor core swap off, a return of the selected RMID to a pool.

11. The system of claim 1, wherein the RMID recycling instruction, when executed by the hardware processor core are to cause:
  an establishment of a baseline of cache occupancy for an RMID;
  select an RMID and measure its cache occupancy at the hardware processor core swap on of the logical processor;
  measure the cache occupancy of the RMID at hardware processor core swap off of the logical processor;
  update the baseline with a delta value based on the measured cache occupancy to the baseline.

12. A method performed by a system having a hardware processor core and memory, wherein the hardware processor core includes a plurality of logical processors each have associated storage, the method comprising:
  selecting a least recently used resource monitoring identification (RMID);
  at hardware processor core swap on, writing the selected RMID to the associated storage for the RMID and writing of a logical processor state to the associated storage for the state; and
  at hardware processor core swap off, returning of the selected RMID to a pool.

13. The method of claim 12, further comprising:
  determining that a cache occupancy associated with the selected RMID is below a threshold.

14. The method of claim 12, wherein the logical processor is a thread.

15. The method of claim 12, wherein the storage for the RMID is a machine state register per logical processor in the hardware processor core.

16. The method of claim 12, wherein the hardware core further comprises:
  a plurality of machine state registers to store resource monitoring data; and
  a plurality of machine state registers to store an event to be associated with an RMID.

17. The method of claim 16, wherein the event is cache occupancy.

* * * * *